Dec. 22, 1925.  A. E. KNOWLES  1,566,543
ELECTROLYTIC CELL
Filed April 3, 1924   4 Sheets-Sheet 4

Inventor:
Albert E. Knowles

Patented Dec. 22, 1925.

1,566,543

UNITED STATES PATENT OFFICE.

ALBERT EDGAR KNOWLES, OF HESWALL, ENGLAND.

ELECTROLYTIC CELL.

Application filed April 3, 1924. Serial No. 704,009.

*To all whom it may concern:*

Be it known that I, ALBERT EDGAR KNOWLES, a subject of the King of Great Britain, of Denecourt, Oldfield Drive, Heswall, Cheshire, England, have invented certain new and useful Improvements in Electrolytic Cells, of which the following is a specification.

This invention relates to a new or improved means for controlling the liquid level in electrolytic cells, and for washing the gas or gases evolved therein, and has for its object to provide simple and automatic means whereby the level of the liquid may be maintained substantially constant.

Where batteries of electrolytic cells are employed, as for example, in the production of oxygen and hydrogen by the electrolysis of water, it is essential that the level of the electrolyte in each of the separate cells should be maintained substantially equal and constant if the battery is to work at maximum efficiency, and hitherto no satisfactory automatic means for effecting this has been devised.

The object of my invention is to enable the feeding of the "make-up" water or other fluid into the cells to be regulated automatically so that it enters each cell at the same rate as the solution is decomposed or evaporated, and so that the level of the liquid in all the cells is maintained substantially correct.

In the case of cells used for the electrolytic production of oxygen and hydrogen by the decomposition of water, it is a further object of the invention to use the incoming fluid, which in this case is distilled water, to wash the gases and remove any traces of the electrolyte which may have been carried over with the gas, and as the electrolyte is taken up by the water it is carried along therewith and is returned to the cells so that there is no loss of electrolyte from this source and the correct degree of concentration of the electrolyte is maintained. The liquid in this case also acts as a liquid seal and explosion trap between the gas collector or holder and the gas-conveying pipes from the cells.

My invention may be arranged in several practical forms to suit the cells for which it is designed, but one practical embodiment adapted for use with a battery of cells for the production of oxygen and hydrogen by the electrolysis of water has been illustrated by way of example in the accompanying drawings in which:—

In this form illustrated three chambers are employed, two outer chambers $a$ of exactly similar construction through which the oxygen and hydrogen evolved in the cells are caused to pass respectively, and a central float chamber or tank $b$ arranged between the first chambers and housing a float for the water supply valve.

Each outer chamber $a$ is a closed vessel of rectangular or similar form, and has near one end a large diameter tube $c$ extending nearly to the bottom of the chamber, and having a flared mouth $d$ at the upper end into which distilled water is directed from a feed pipe $e$.

Within the chamber near the other end is a cylindrical, conical, or other closed gas distributing head or rose $f$, the bottom of which is perforated, and into the upper end of which a pipe $g$ from a gas main from the battery of cells is led, the head being supported by the pipe which is slidably mounted in a boss $h$ in the cover of the chamber, so that the height of the head in the chamber can be varied by rotating the adjusting nut $j$ on the threaded periphery of the pipe $g$.

A further pipe $k$ leading from the cover serves to convey the gas to a gas holder or pump.

The central chamber or tank $b$ is also of rectangular form and a water pipe $l$ from each side chamber is led into the upper end of the tank and is carried downwards towards the bottom of the tank. A further water pipe $m$ is led from the bottom of the tank to the battery of cells, and has branch-pipes leading to each cell, these branch pipes being suitably insulated, as for example, by the insertion of short lengths of glass tubing.

Located within the tank $b$ is a ball float $n$ having a boss on its upper face into which is screwed the lower end of a short screwed rod $o$. The upper end of this rod is screwed into a threaded bush in the end of a hollow tubular member $p$ and is provided with a locknut so that by screwing the rod into or out of the member $p$ the distance of the float from the member $p$, and hence the position at which the float comes into action, may be adjusted. The member $p$ is pivoted at its upper end to one end of a lever $q$ which is pivoted at its other end to a bracket $r$ on the top of the chamber, and about the middle of its length is pivotally connected to a bifurcated lug on the lower end of the vertical stems of a needle valve which controls the flow of liquid from the water-supply main to the feed-pipes $e$.

Figure 1:
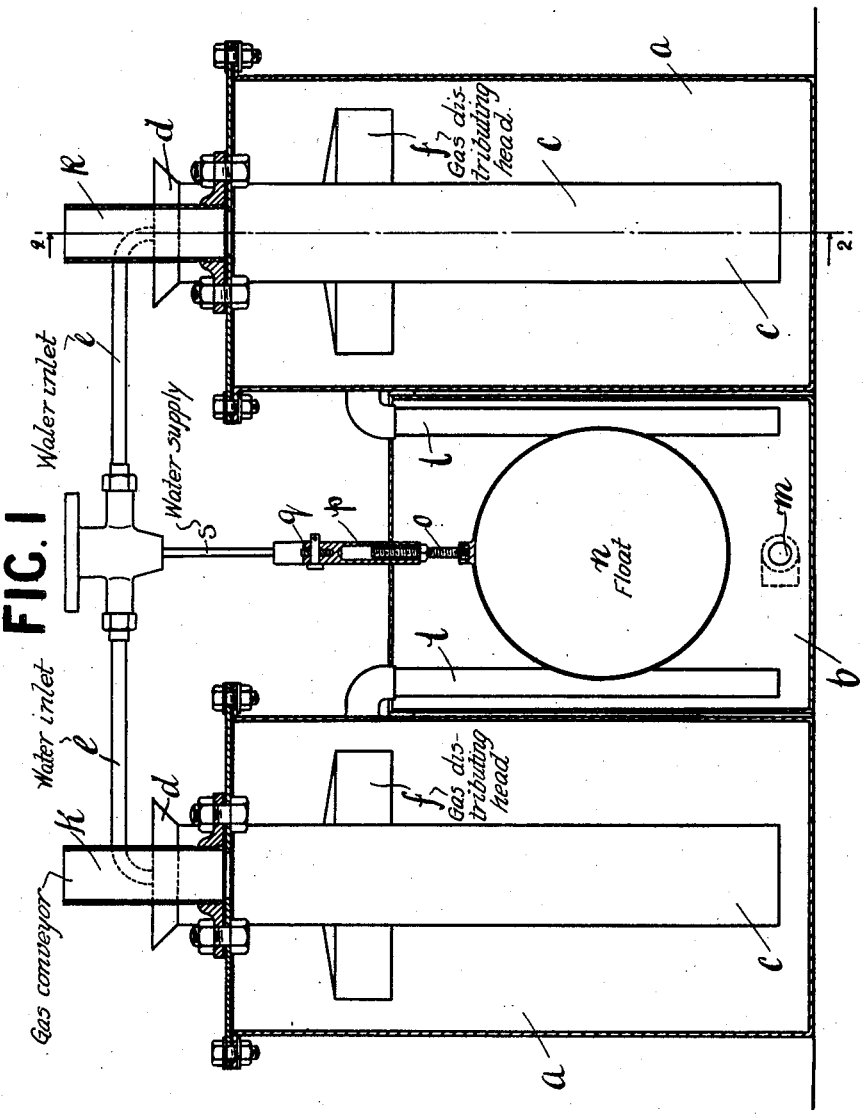
Figure 1, is a vertical section through the three chambers.
Figure 2:
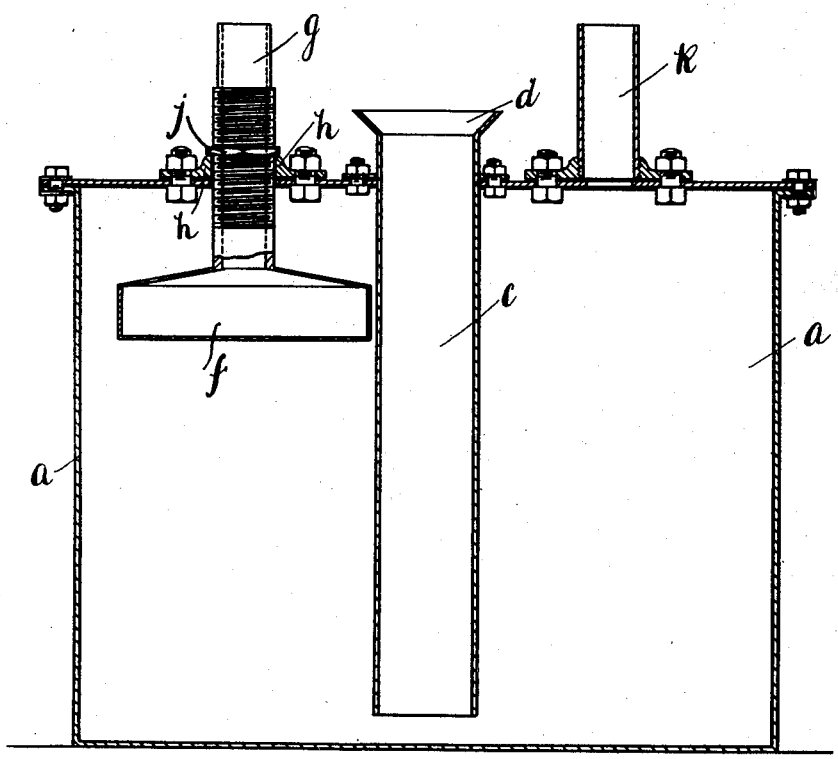
Figure 2, is a section on the line 2—2 of Fig. 1.
Figure 3:
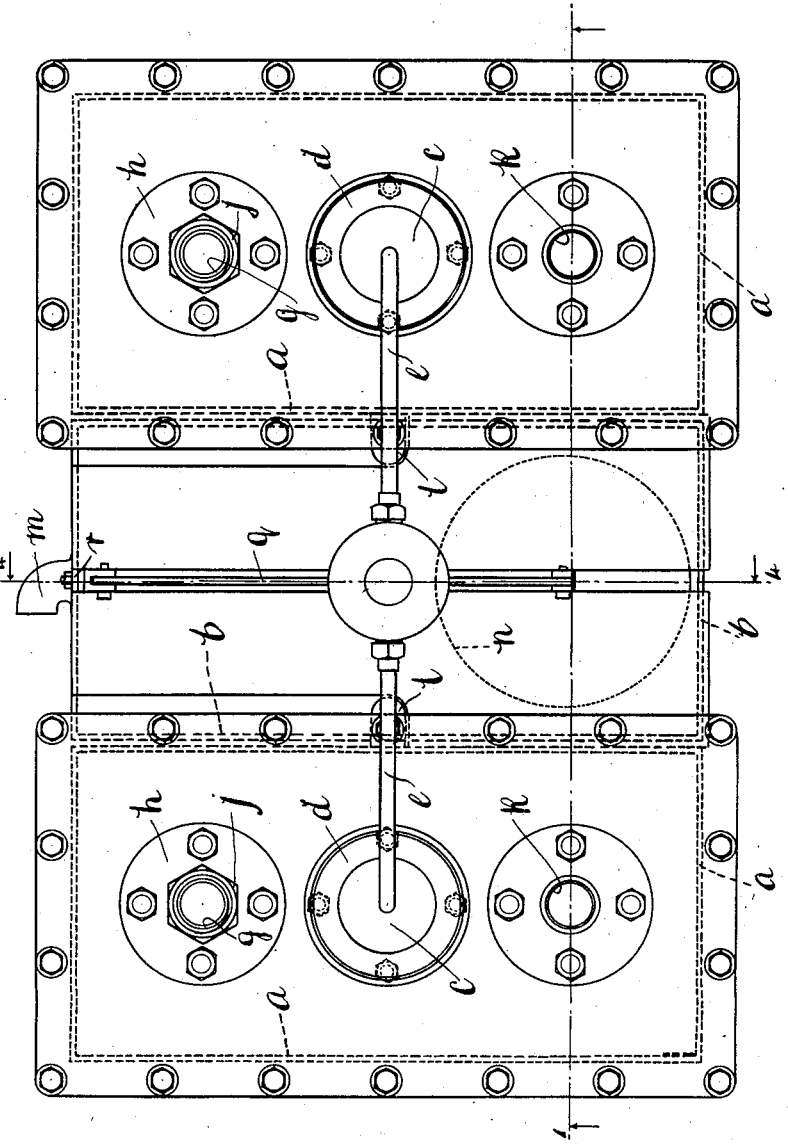
Figure 3, is a plan of the three chambers.
Figure 4:
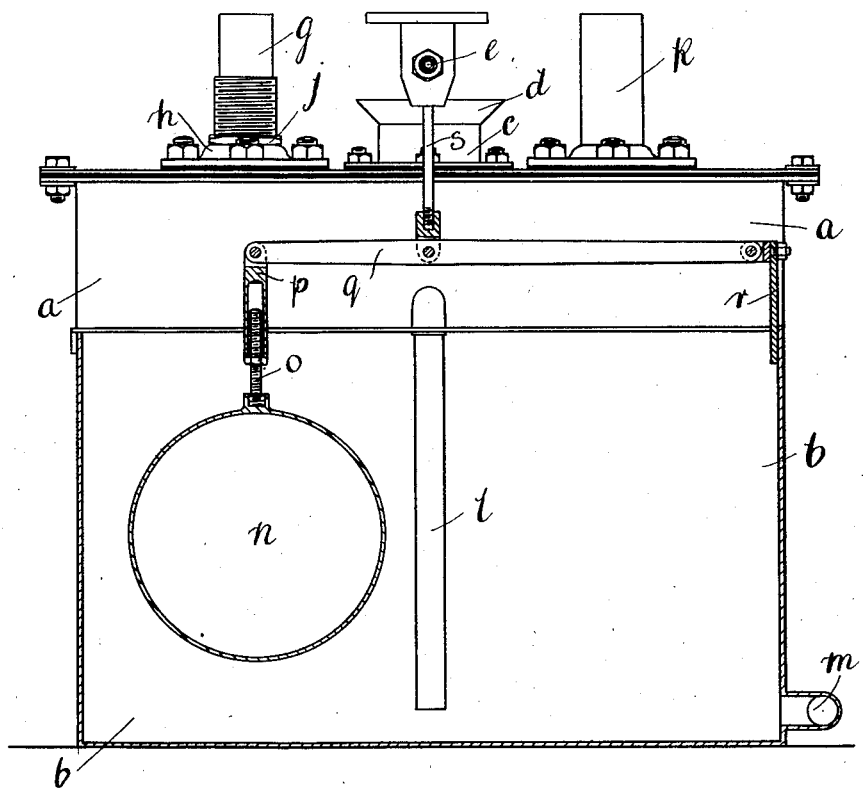
Figure 4, is a section on the line 4—4 of Fig. 1.
Figure 5:
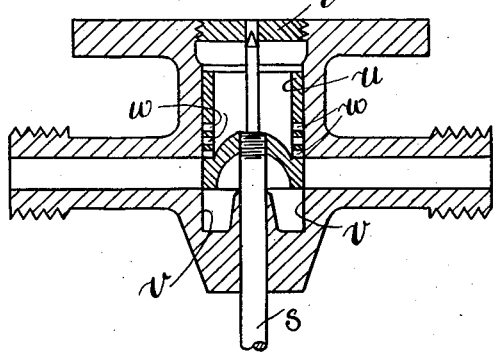
Figure 5, is a section on an enlarged scale of the valve which controls the water supply.
Figure 6:
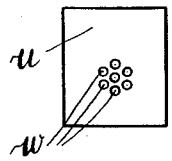
Figure 6, is a side elevation of the valve piston.

As it is generally desirable that the supply of fluid to the two outer chambers be equal, I prefer to employ the special type of valve illustrated in Figs. 5 and 6 in which the end of the stem $s$ is tapered and engages an aperture in a disc $t$ closing the water supply pipe, and the valve stem carries a hollow piston $u$ sliding in a cylindrical chamber $v$ in the valve casing, and having two series of small diametrically opposed apertures $w$ or opposed slots which register when the valve is open with openings leading to the respective feed pipes $e$.

If owing to the position of the chambers or for any other reason it is desirable that the supply of water should be greater to one chamber $a$ than to the other, this can readily be arranged by enlarging the apertures $w$ in the side of the piston adjacent to this chamber.

The action of the apparatus will be readily followed from the above description. Water from a suitable source of supply passes through the valve and through the feed pipes $e$ into the two side chambers $a$ and from there into the central tank from which it passes through the delivery pipe $m$ and branch pipes to the cells.

The float is adjusted so that it cuts off the water supply when the water level in the cells and therefore in the tank reaches the required height, this action being continuous and automatic as the electrolyte in the cells is used up or evaporated. Simultaneously the gases evolved from the cells are led into the perforated heads $f$ in the side chambers $a$ and bubbling through the water therein are washed of any electrolyte which may be present in the form of vapour or spray before passing on to gas-holders or pumps.

In the example illustrated the float chamber or tank $b$ has been shown located between the chambers $a$, but it will be understood that this arrangement may be varied to suit the space available.

For example, the two chambers $a$ may be arranged adjacent to each other and the chamber or tank $b$ placed to one side or in front.

I claim:—

1. Means for automatically maintaining the liquid level in electrolytic cells and for washing the gas evolved therein, comprising liquid containing means, a valve through which liquid is supplied to the said means, means for leading gas into the said containing means below the surface of the liquid therein, an outlet for the gas, a tank, a float in the said tank controlling the said valve for the liquid supply, means for conveying liquid from the said containing means to the said tank, and means for distributing liquid from the said tank to the electrolytic cells.

2. Means for automatically maintaining the liquid level in electrolytic cells and for washing the gas evolved therein, comprising a pair of closed liquid containing chambers, a single valve through which liquid is supplied to the said chambers, means for leading gas into each of said chambers below the surface of the liquid therein, a gas outlet in the upper end of each of said chambers, a tank, a float in said tank controlling the said valve, a pipe conveying liquid from each chamber to the said tank, and means for distributing liquid from the said tank to each of the electrolytic cells.

3. Means for automatically maintaining the liquid level in electrolytic cells and for washing the gas evolved therein, comprising a liquid-containing means, a valve through which liquid is supplied to the said containing means, a float by which said valve is controlled, a tank wherein said float is located and into which liquid flows from the containing means, a gas inlet into the containing means terminating in a perforated head submerged in the liquid therein, a gas outlet in the upper end of the containing means, and means for distributing liquid from the said tank to each of the electrolytic cells.

4. Means for automatically maintaining the liquid level in electrolytic cells and for washing the gas evolved therein, comprising a pair of closed liquid containing chambers, a valve through which liquid is supplied from a liquid supply pipe to the chambers, means for leading gas into each chamber below the level of the liquid therein, a gas outlet in the upper end of each chamber, a tank into which liquid from each chamber flows, means for distributing liquid from the tank to the electrolytic cells, and a float located within the tank and operating the valve for the supply of liquid to the chambers, the said valve consisting of a needle valve cooperating with an aperture in a disc closing the liquid supply pipe and a piston on the stem of the needle valve working within a cylinder and having apertures in its side walls through which the liquid is distributed to the chambers.

5. In means for automatically maintaining the liquid level in electrolytic cells and for washing the gas evolved therein, a perforated gas inlet head, as set forth in claim 3, and means for adjusting the head in a vertical direction to control the depth to which the head is submerged in the liquid in the containing means.

6. In means for automatically maintaining the liquid level in electrolytic cells and for washing the gas evolved therein, a float and a valve controlled thereby, as set forth in claim 1, a pivotal lever operated by the float and connected to the stem of the valve and means for adjusting the position of the float relative to the lever to vary the point at which the valve is operated by the float.

In testimony whereof I affix my signature.

ALBERT EDGAR KNOWLES.